United States Patent
Ono et al.

(10) Patent No.: US 6,491,438 B1
(45) Date of Patent: Dec. 10, 2002

(54) MAIN BEARING FOR ENGINE

(75) Inventors: Akira Ono; Satoshi Imai; Takayuki Shibayama, all of Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 09/572,932

(22) Filed: May 18, 2000

(30) Foreign Application Priority Data

Jun. 1, 1999 (JP) ............................. 11-153923

(51) Int. Cl.[7] ................................. F16C 17/02
(52) U.S. Cl. .................. 384/288; 384/291; 384/292
(58) Field of Search ............................. 384/288, 294, 384/292, 291, 397

(56) References Cited

U.S. PATENT DOCUMENTS

| | | |
|---|---|---|
| 2,673,767 A | 3/1954 | Schoeppner |
| 4,105,267 A | 8/1978 | Mori |
| 4,400,099 A | 8/1983 | Ehrentraut |
| 5,333,955 A | 8/1994 | Papa |

FOREIGN PATENT DOCUMENTS

| | | |
|---|---|---|
| GB | 524128 | 7/1940 |
| GB | 2 323 414 | 9/1998 |
| GB | 2 332 485 | 6/1999 |

*Primary Examiner*—Lenard A. Footland
(74) *Attorney, Agent, or Firm*—Browdy and Niemark, P.L.L.C.

(57) ABSTRACT

It is an object of the invention to improve wear resistance and an anti-seizure property of a portion, on which a radial load operates owing to tension of a cogged belt or a V-belt, of a plain bearing for an engine. A main shaft portion of a crankshaft is in uneven contact with an upper half bearing owing to tension of the cogged belt and/or the V-belt. A branch groove is formed in a portion forwarder than an oil groove formed on the bearing surface of a upper half bearing of a plain bearing, the branch groove branching off from the oil groove. When an engine stops, lubricant is stored within the branch grooves, and when the engine restarts, the lubricant within the branch grooves is immediately supplied to the uneven contact portion of the main shaft portion though the rotation thereof.

8 Claims, 11 Drawing Sheets

(a)

(b)

MAIN BEARING FOR ENGINE

FIELD OF THE INVENTION

The present invention relates to a main bearing for an engine, which supports a crankshaft on which a radial load always operates in a single direction owing to tension of a belt installed for transmitting rotation, and more particularly to a main bearing for an engine, which improves wear resistance and an anti-seizure property of a portion taking the radial load in a single direction.

PRIOR ART

In an automobile gasoline engine, for example, a camshaft, an alternator, a compressor for an air conditioner or the like are driven by utilizing the rotation of a crankshaft. The crankshaft is connected with the camshaft through a dogged belt and with the alternator and compressor through V-belts for transmitting the rotation.

On the cogged belt and V-belt, a predetermined tension is applied in order to prevent tooth skipping, slippage, or the like. Because of the tension applied on the cogged belt and V-belt, the crankshaft takes a radial load, and the radial load is received by a main bearing which supports the main shaft portion of the crankshaft.

The direction of the resultant force of the radial loads operating on the crankshaft by the tension applied to the cogged belt and the V-belt or the like is opposite from that of a combustion pressure (normally, downward in a vertical type engine) operating on the crankshaft from a piston through a connecting rod during the run of the engine, whereby a load operating in the same direction with a combustion pressure is eliminated in order to prevent the specific load on the main bearing from growing excessively, so that the bearing service life is lengthened.

SUMMARY OF THE INVENTION

Tensions of a cogged belt and V-belt always operate on a crankshaft, and when an engine stops, a main shaft portion of the crankshaft will be pressed against a main bearing owing to a radial load resulting from the tensions of the above described belts. when the engine stops, an oil pump will also stop and then the supply of lubricant to the main bearing will be cut off. By this reason, a film of oil on the main bearing surface is broken by the above described radial load always operating on the crankshaft, and the main shaft portion of the crankshaft will be brought into direct metal contact with the main bearing surface.

When the engine restarts, the oil pump will also start. However, lubricant will be supplied late from the oil pump to the main bearing. Thus, the main shaft portion of the crankshaft will rotate in an incomplete lubricated state, whereby there is a possibility of the seizure as well as the increase of wear of the main bearing.

Especially in recent years, a vehicle which stops the engine when stopping at a crossroad and a hybrid car using both an engine and an electric motor have come into the market in order to prevent the exhaust of combustion gases causing environmental pollution as much as possible. The engine used in such a vehicle frequently repeats a start and a stop, and is also required to rotate at high revolution beyond a range of an idle engine revolution immediately after the start. Moreover, in such an engine which frequently repeats a start and a stop, there is a need to tighten a cogged belt and a V-belt to high tension to prevent tooth skipping and slippage of these belts more reliably. Because of this reason, the main shaft portion of the crankshaft frequently rotates in a metal contact state with the main bearing or in an incomplete lubricated state, and in some cases, these states cause abnormal wear and seizure.

The present invention has been made in view of the above described circumstances. Accordingly, the object of the invention is to provide a main bearing for an engine which can improve wear resistance and an anti-seizure property of a portion of the main bearing which takes a radial load by tension of a cogged belt or a V-belt.

According to a first aspect of the present invention, in order to achieve the above object, a main bearing is provided with an oil pocket portion for storing lubricant to be supplied to a portion of the bearing surface, against which a crankshaft is pressed by a radial load in a single direction, so that the lubricant stored in the oil storing portion is supplied to the portion against which the crankshaft is pressed by the radial load substantially at the time that the crankshaft starts rotating. Accordingly, a complete lubricated state or almost the same state with that is obtained at the beginning of the start of the engine, and wear resistance and an anti-seizure property of the main bearing are enhanced.

The oil pocket portion may be a plurality of recesses, or may be a plurality of grooves.

Moreover, the oil pocket portion also may be a branch groove formed so as to branch off from an oil groove formed on the bearing surface along its circumferential direction.

Furthermore, in order to achieve the above described object, a second aspect of the present invention is characterized in that linear hard portions are formed in parallel with each other in a portion, against which the crankshaft is pressed by the radial load in a single direction, among circumferential portions of the bearing surface.

According to this constitution, a portion between the hard portions becomes in a concave shape since the relatively soft portion other than the hard portions in the portion against which the crankshaft is pressed by the radial load in a single direction is worn away early by the rotation of the shaft at the beginning of use while the hard portions are difficult to be worn away, whereby lubricant is stored in the recess. Thereafter, lubricant stored in the recess is always supplied to the portion against which the crankshaft is pressed by the radial load nearly at the same time as the shaft starts rotating, whereby excessive wear and seizure of the portion are prevented in the same way as the first aspect of the invention.

A third aspect of the present invention is characterized in that a plurality of concave streaks are formed on the bearing surface along its circumferential direction, and a portion, against which the crankshaft is pressed by the radial load in a single direction, of the bearing surface is formed to be harder than the remaining portions.

According to this constitution, a protruding portion between adjacent concave streaks is difficult to be worn away in the hardened portion and thus the concave streaks remain as they are over a long period of time. As a result, lubricant can be supplied over a long period of time to the portion against which the crankshaft is pressed by the radial load in a single direction.

A fourth aspect of the present invention is characterized in that a recess is formed on the bearing surface in a portion, against which the crankshaft is pressed by the radial load in a single direction, and the recess is provided with a solid lubricant therein.

According to this constitution, the same advantageous effect as that of the first aspect of the invention can be obtained since the solid lubricant is supplied to the portion of the main bearing against which the crankshaft is pressed.

DESCRIPTION OF THE PREFERRED EMBODIMENTS

A first embodiment of the present invention applied to an automobile engine will hereinafter be described in detail with reference to FIGS. 1–6.

Figure 5:
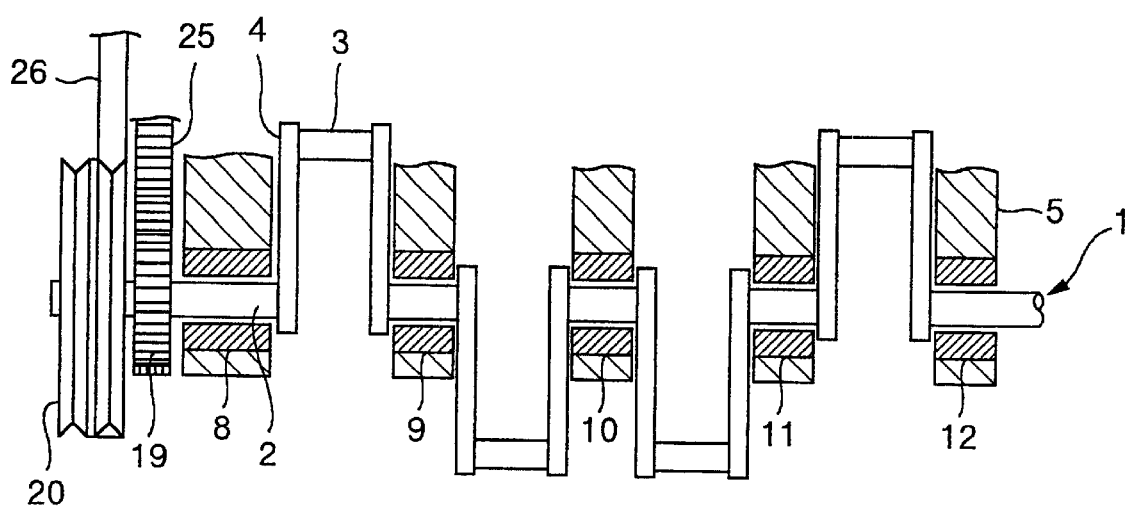
FIG. 5 is a side view showing the crankshaft together with the main bearings.

As illustrated in FIG. 5, a crankshaft 1 for an automobile engine comprises three parts, namely, main shaft portions 2, crank pins 3, and crank arms 4. The crankshaft 1 in this embodiment is that of an inline 4 engine, for example, in which the main shaft portions 2 and the crank pins 3 are alternately disposed one by one.

Figure 4:
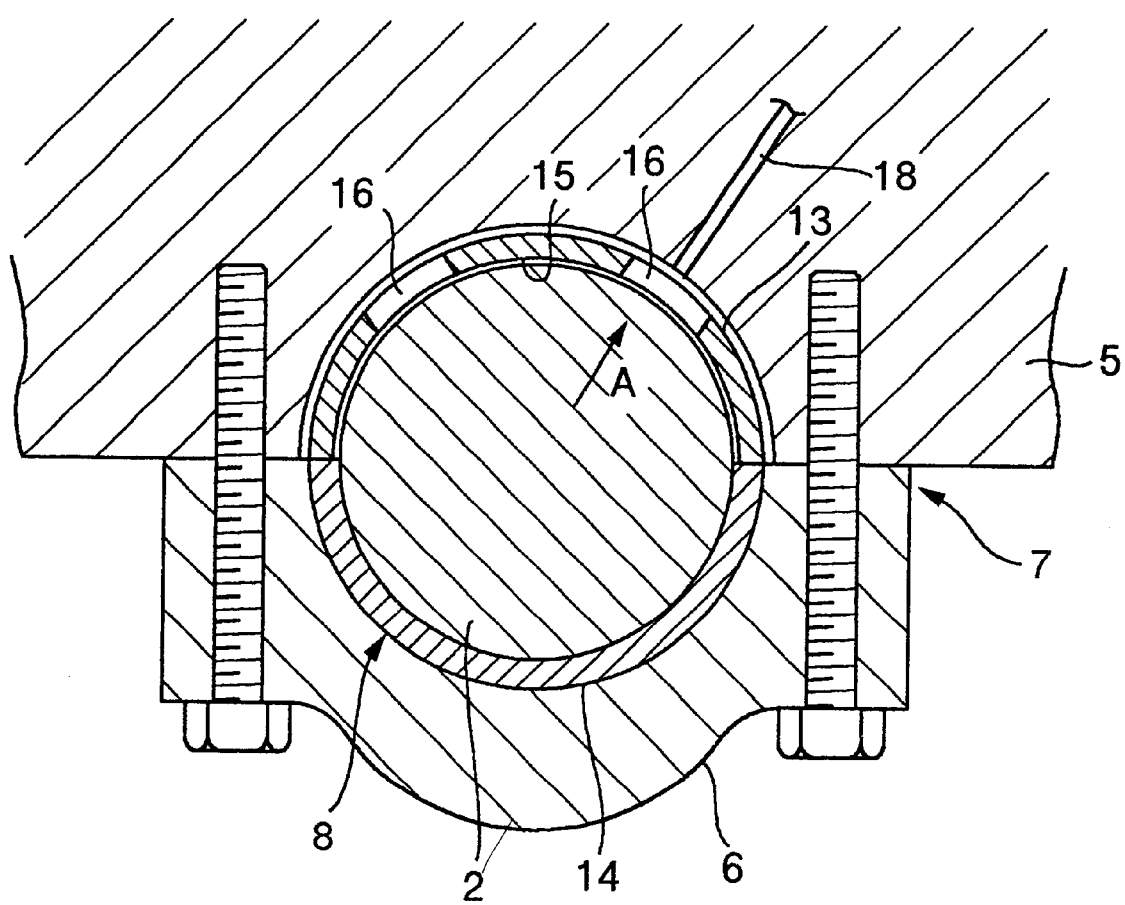
FIG. 4 is a vertical sectional view of the main bearing portion.

The above described crankshaft 1 is disposed in the lower portion of a cylinder block 5. As also shown in FIG. 4, a bearing cap 6 is fixed to the lower portion of the cylinder block 5 by means of bolts, whereby a bearing housing 7 is constituted by the cylinder block 5 and the bearing cap 6. The main shaft portions 2 of the crankshaft 1 are supported by main bearings 8–12 installed in the bearing housings 7. Moreover, the main bearings 8–12 supporting the main shaft portions 2 are numbered as "the first, the second, . . . " respectively in order from the front end (the left end in FIG. 5) of the crankshaft 1.

Figure 1:
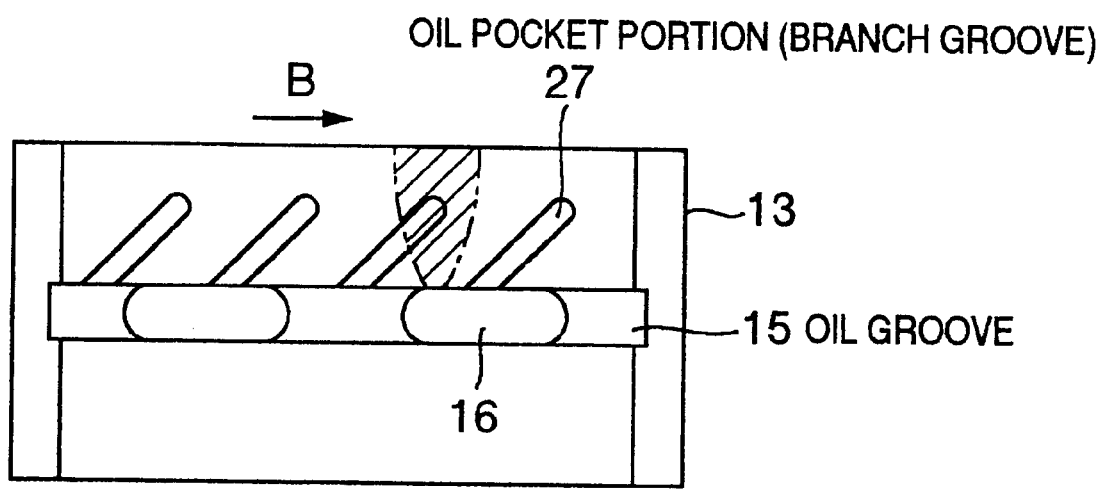
FIG. 1 is a plan view of an upper half bearing of a main bearing, which shows a first embodiment of the present invention.
Figure 2:
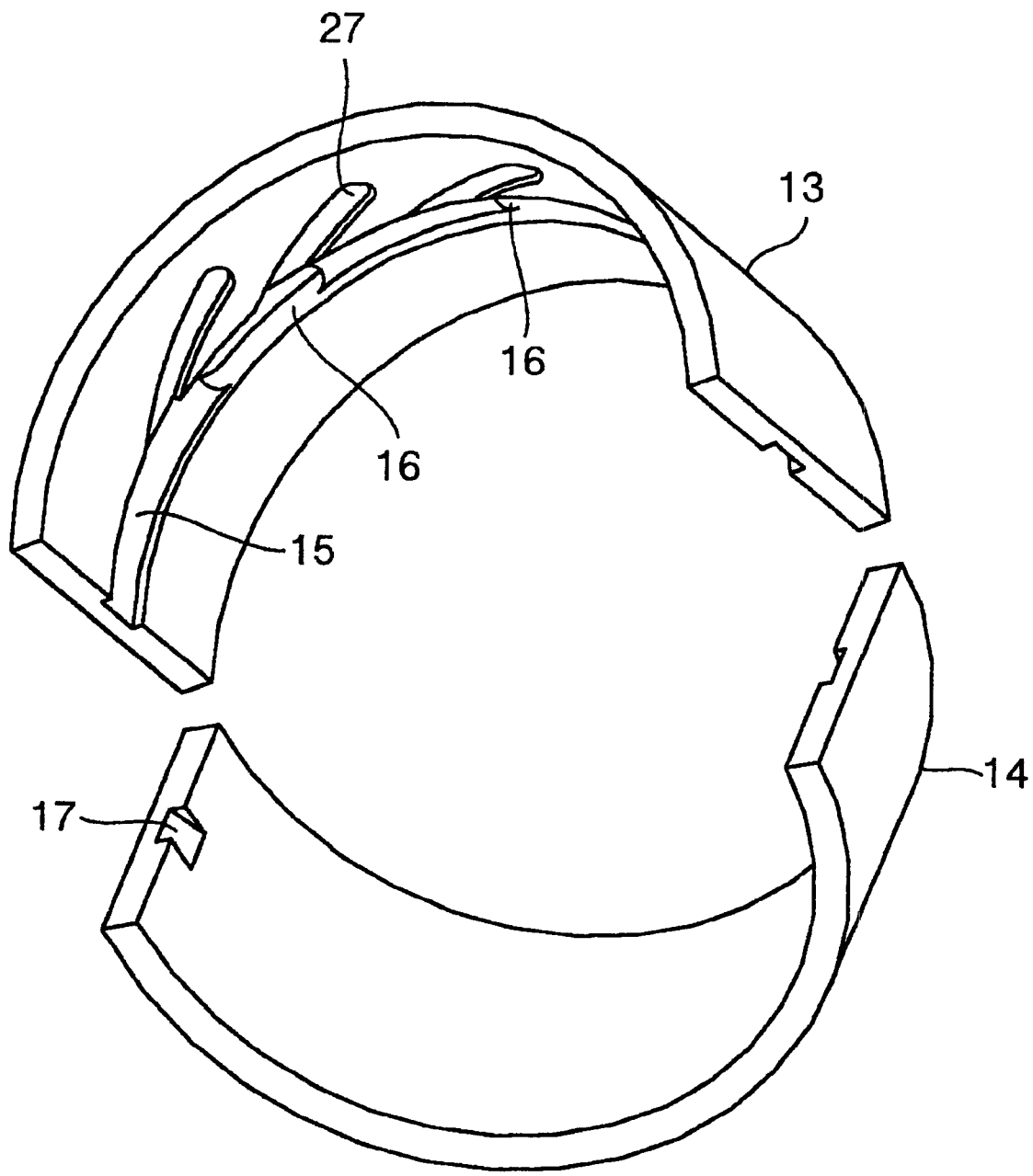
FIG. 2 is an exploded perspective view of the main bearing.

Each of the main bearings 8–12 is configured by a plain bearing comprising two half bearings 13 and 14, as shown in FIG. 2. The upper half bearing 13 is attached to the cylinder block 5, while the lower half bearing 14 is attached to the bearing cap 6. The bearing cap 6 is bolted to the cylinder block 5, whereby the two half bearings 13 and 14 are configured as the cylindrical main bearings 8–12. Moreover, the half bearings 13 and 14 are configured by mounting a bearing alloy on the inner circumference of the steel backing plate respectively, as well known in the prior art.

The structure for lubrication in the main bearings 8–12 is as follows. That is, an oil groove 15 is formed on the bearing surface (inner peripheral surface) of the upper half bearing 13 among the upper and lower half bearings 13 and 14 configuring each of the main bearings 8–12 over the entirety of the circumferential direction at the axially central portion. Moreover, two elongated oil holes 16 are formed in the upper half bearing 13 for opening the oil groove 15 to the outside.

On the bearing surface of the lower half bearing 14, partial grooves 17 are formed at the axially central portions of the opposite circumferential ends. The partial grooves 17 are continuous to the circumferential oil groove 15 and form the opposite end portions of the oil groove 15, when the upper and lower half bearings 13 and 14 are engaged to form each of the main bearings 8–12. The reason why there is no oil groove on the entire bearing surface of the lower half bearing 14 is that the lower half bearing 14 is subjected to a high combustion pressure through a connecting rod (not shown) from a piston (not shown) and thus the specific load is reduced by enlarging the area taking the pressure from the main shaft portions 2.

As shown in FIG. 4, lubrication oil is supplied from an oil passage 18 formed in the cylinder block 5 toward the oil hole 16 of each main bearing 8–12 configured by the upper and lower half bearings 13 and 14. The lubrication oil supplied to the oil hole 16 flows from the oil groove 15 to the partial grooves 17 and is supplied to the space between the bearing surfaces of the upper and lower bearings 13 and 14 and the main shaft portions 2 of the crankshaft 1, whereby lubrication is established on the main bearings 8–12.

Figure 6:
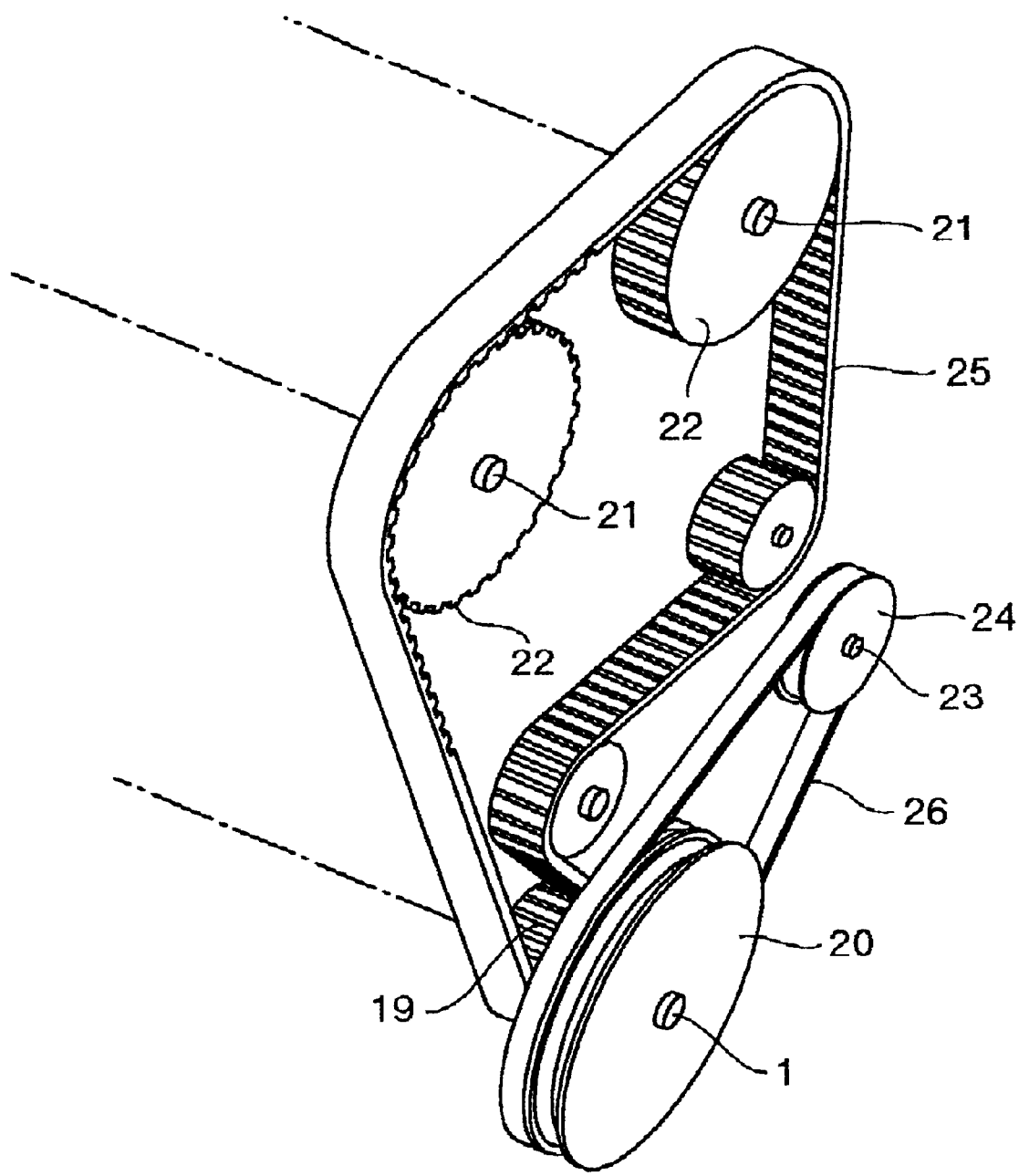
FIG. 6 is a perspective view showing a belt transmitting mechanism attached to the front end portion of the crankshaft.

As shown in FIGS. 5 and 6, a toothed pulley 19 and a V-belt pulley 20 are mounted on the front end of the crankshaft 1. On the other hand, cam shafts 21 for opening and closing an intake valve and an exhaust valve are attached to the upper portion of the cylinder block 5, and toothed pulleys 22 are mounted on the cam shafts 21. Moreover, an alternator, an air-conditioning compressor, etc. (only a rotating shaft 23 of one of them is shown), are attached to the side portion of the cylinder block 5, and a V-belt pulley 24 is mounted on those rotating shaft 23.

A cogged belt 25 is put up between the toothed pulley 19 of the crankshaft 1 and the toothed pulleys 22 of the cam shafts 21, and a V belt 26 is put up between the V-belt pulley 20 of the crankshaft 1 and the V-belt pulley 24 of the rotating shaft 23 for a generator and an air conditioner. The cogged belt 25 and the V-belt 26 are given a predetermined tension so as to prevent tooth skipping, slippage or the like.

The crankshaft 1 is subjected to a load in a radial direction by tension applied to the cogged belt 25 and V-belt 26. In this case, the direction in which tension is applied to the belts 25 and 26 is determined so that the direction of the resultant force of the radial loads (hereinafter referred to as a resultant radial load) applied to the crankshaft 1 by the tension of the belts 25 and 26 becomes the upward direction, which is opposite that of the combustion pressure to which the crankshaft 1 is subjected through the piston (not shown)

during running of the engine, for example, the direction indicated by an arrow A in FIG. 4.

Figure 3:
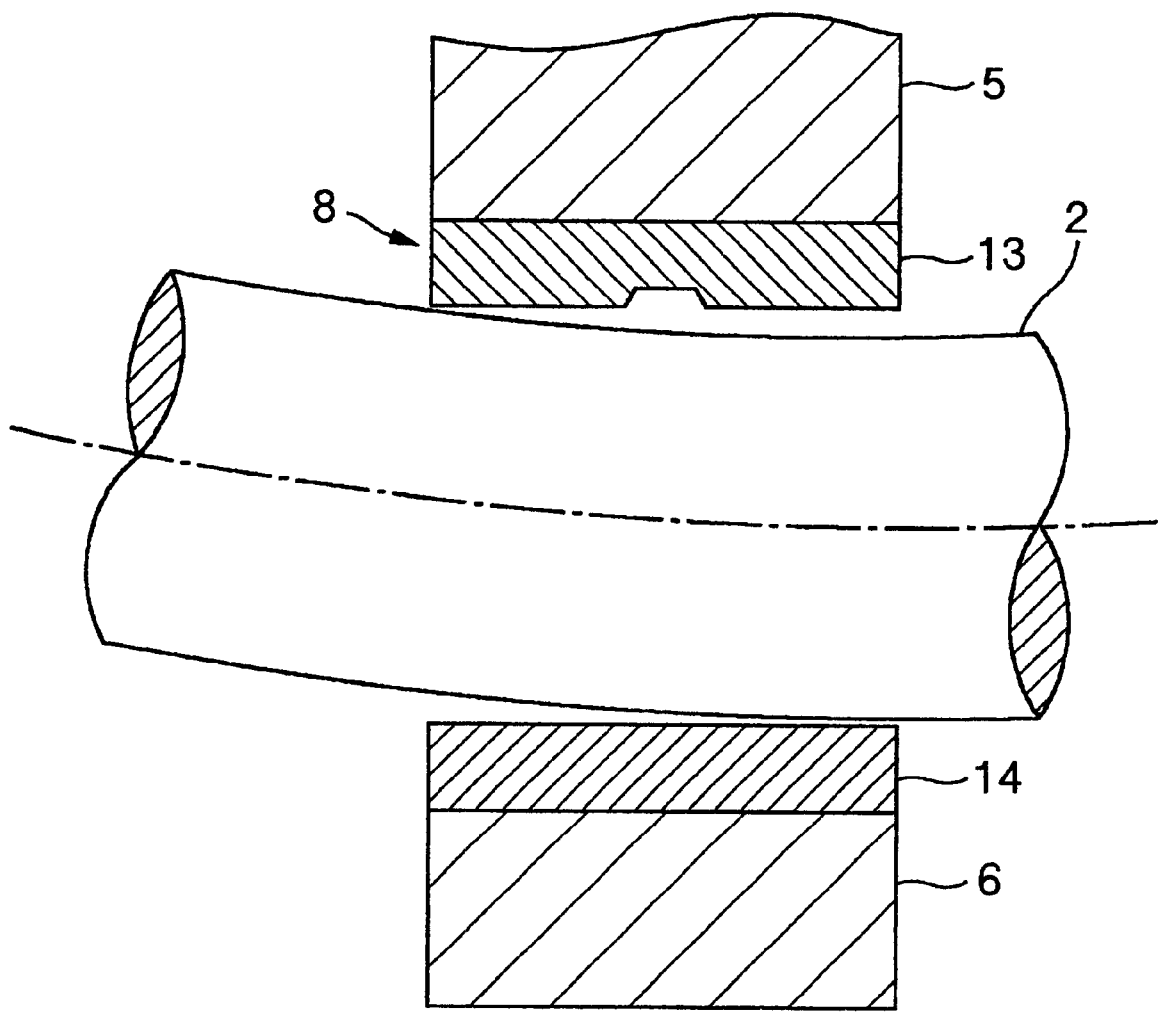
FIG. 3 is a sectional view showing a supported manner of the front end portion of a crankshaft by the main bearing.

The front end portion of the crankshaft 1 is subjected to the bending moment by the tension applied to the above described cogged belt 25 and V-belt 26. The bending moment is mainly transmitted as the radial load in the direction of the arrow A to the first main bearing 8 nearest the front end of the crankshaft 1. The radial load by this bending moment is received by the upper half bearing 13 of the first main bearing 8. However, because the front end portion of the crankshaft 1 is bent upward as shown in FIG. 3, the front end portion abuts on the portion of the upper half bearing 13 nearer to the front end portion of the crankshaft 1 than to the axial center of the upper half bearing 13, so that the radial load acting on the crankshaft 1 is received on the uneven contact portion of the upper half bearing 13. The bending of the crankshaft 1 in FIG. 3 is shown in exaggeration. The uneven contact portion abutted by the crankshaft 1 is indicated by oblique lines in FIG. 1 as a portion including the center line on which a line passing through the center of the main shaft portion 2 of the crankshaft 1 in the same direction as the arrow A and the surface of the upper half bearing 13 cross.

On the bearing surface of the upper half bearing 13 of the first main bearing 8, a plurality of branch grooves 27 are formed as an oil storing portion between the front end and axial center of the upper half bearing 13. Each branch groove 27 extends obliquely so that it branches off from the central oil groove 15 toward the front end of the upper half bearing 13, and the depth is shallower than the oil groove 15. The direction of inclination of the branch groove 27 is determined so that it inclines from the oil groove 15 toward its outer end in the direction of the arrow B shown in FIG. 1, when the crankshaft 1 rotates in the direction of the arrow B.

Next, the operation by the above described constitution will be described. Note that the following description refers to the first main bearing 8 and thus the upper and lower half bearings 13 and 14 described therein also refer to the first main bearing 8. During running of the engine, lubrication oil is supplied from the oil passage 18 to the oil groove 15 (branch grooves 27) of the main bearing 8, and then lubrication is performed between the main shaft portion 2 of the crankshaft 1 and the main bearing 8. When the engine stops, the lubrication oil existing in the space between the main bearing 8 and the main shaft portion 2 returns from the space to an oil pan. However, the lubrication oil within the branch groove 27 remains stored as it is within the branch groove 27 without returning by the surface tension with the main bearing portion. In addition, when the engine stops, the crankshaft 1 is pressed against the upper half bearing 13 of the main bearing 8 and brought into metal contact with the upper half bearing 13 by the tension on the cogged belt 25 and V-belt 26 or the like.

When the engine restarts from this state, the lubrication oil within the branch groove 27 adheres to the main shaft portion 2 and is supplied to the sliding space between the main bearing 8 and the main shaft portion 2 according to rotation of the crankshaft 1. For this reason, the main shaft portion 2 rotates in a complete lubricated state nearly at the same time as start of the engine. Since the branch groove 27 inclines in the direction of rotation of the main shaft portion 2 toward its outer end, the lubrication oil within the branch groove 27 is easily discharged from the branch groove 27 into the sliding space between the main bearing 8 and the main shaft portion 2 according to rotation of the main shaft portion 2, so that early wearing, seizing or the like can be prevented more reliably.

Moreover, in this embodiment, because the branch groove 27 is formed, the bearing area of the upper half bearing 13 is reduced. However, the branch groove 27 is obliquely formed, so that a reduction in the actual loaded area of the upper half bearing 13 with respect to the main shaft portion 2 can be minimized. That is, the main shaft portion 2 contacts the portion of the upper half bearing 13 indicated by oblique lines in FIG. 1. If the branch groove 27 extends in a direction perpendicular to the oil groove 15 instead of extending obliquely, there are some cases where the actual loaded area of the upper half bearing 13 with respect to the main shaft portion 2 is reduced and actual specific load increases excessively when the load portion of the main shaft portion 2 is aligned with the branch groove 27. However, in this embodiment, the branch groove 27 extends obliquely and thus the area of the branch groove 27 which is located within the load portion of the main shaft portion 2 becomes small. As a result, the actual loaded area of the upper half bearing 13 with respect to the main shaft portion 2 can be widely ensured and an excessive increase of the specific load can be prevented.

Figure 7:
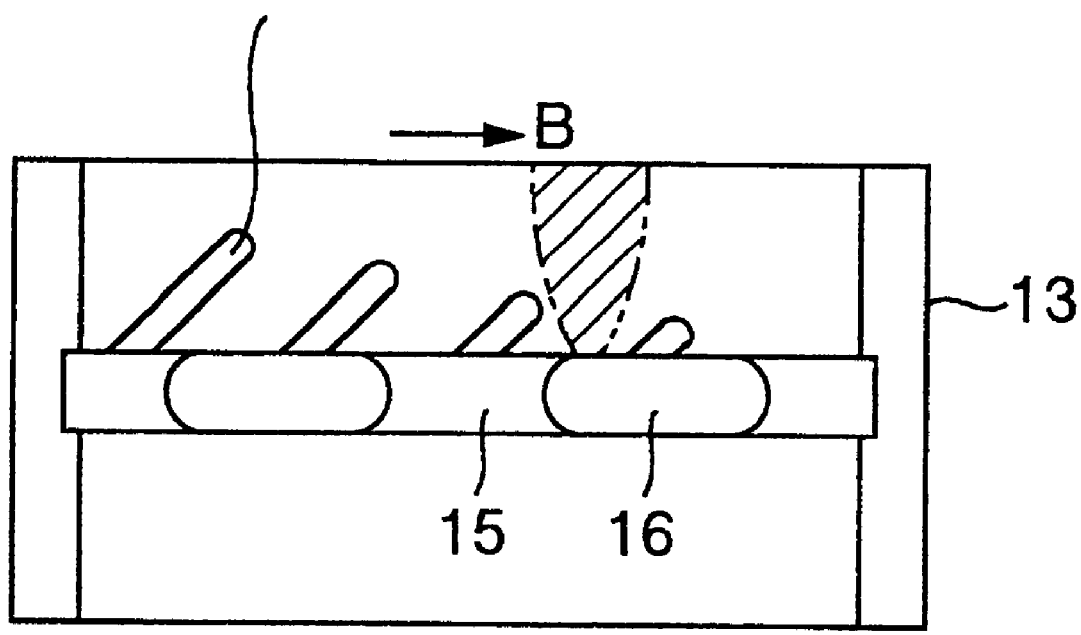
FIG. 7 is a view similar to FIG. 1 showing a second embodiment of the present invention.

FIG. 7 shows a second embodiment of the present invention. The second embodiment differs from the above described first embodiment in that the branch groove 28 becomes shorter in length as coming close to the actual loaded portion. In this case, the area of the branch groove 28 which is located within the load portion of the main shaft portion 2 can be made even smaller by designing the load portion of the upper half bearing 13 with respect to the main shaft portion 2 so that the load portion is shifted toward the direction of rotation of the main shaft portion 2 as shown by oblique lines in FIG. 7, for example.

Figure 8A:
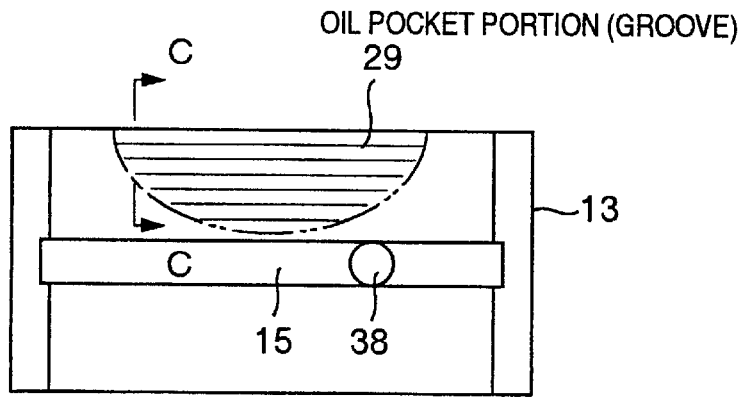
FIG. 8A is a view similar to FIG. 1 showing a third embodiment of the present invention.
Figure 8B:
FIG. 8B is an enlarged sectional view substantially taken along a line C—C of FIG. 8A.

FIGS. 8A and 8B show a third embodiment of the present invention. Between the axial center and front end of the upper half bearing 13, a plurality of narrow grooves 29, which operate as an oil storing portion, are formed in the circumferential direction in an area including a portion which is abutted by the main shaft portion 2. Moreover, the about shaft rotating direction of the narrow groove 29 is not limited to the circumferential direction.

In the third embodiment, lubrication oil is stored in the narrow grooves 29 when the engine is stopped, and the lubrication oil stored in the narrow grooves 29 is supplied to the portion which is abutted by the main shaft portion 2 when the engine is restarted. Therefore, this embodiment is capable of obtaining the same effect as the above described first embodiment.

Figure 9:
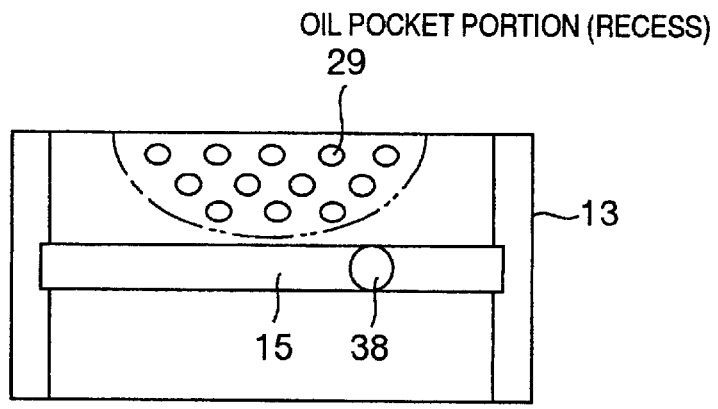
FIG. 9 is a view similar to FIG. 1 showing a fourth embodiment of the present invention.

FIG. 9 shows a fourth embodiment of the present invention. Between the axial center and front end of the upper half bearing 13, a plurality of circular small recesses 30, which operate as an oil storing portion, are formed in an area including a portion which is abutted by the main shaft portion 2.

Figure 10A:
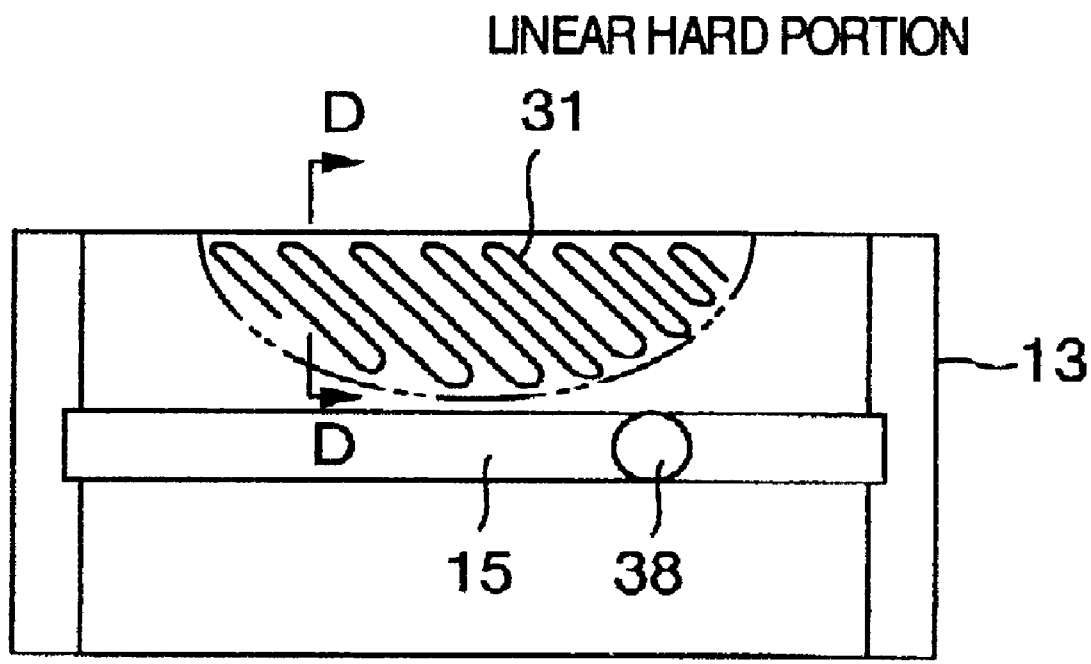
FIG. 10A is a view similar to FIG. 1 showing a fifth embodiment of the present invention.
Figure 10B:
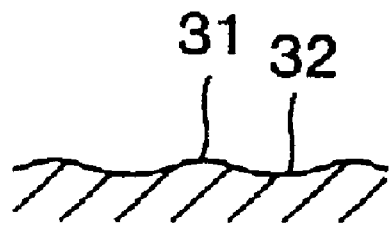
FIG. 10B is an enlarged sectional view substantially taken along a line D—D of FIG. 10A.

In this embodiment, lubrication oil is stored in the recesses 30 when the engine is stopped, and the lubrication oil stored in the recesses 30 is supplied to the portion which is abutted by the main shaft portion 2 when the engine is restarted. Moreover, the shape of the recesses 30 may be various types of spherical, square and so on. FIGS. 10A and 10B show a fifth embodiment of the present invention. Between the axial center and front end of the upper half bearing 13, linear hard portions 31 is formed in parallel in the area including the portion that is abutted by the main shaft portion 2. Moreover, the linear hard portion 31 can be formed by emitting, for example, a laser beam to the bearing surface of the upper half bearing 13.

In the upper half bearing 13 of the fifth embodiment, at first, there is no uneven relation between the hard portion 31 and the soft portion other than the hard portion 31. For this reason, at the beginning of use of the engine, the supply of lubrication oil to the portion of the upper half bearing 13 abutted by the main shaft 2 is not smoothly performed when the engine starts. Therefore, the hard portion 31 will not wear so much, but the soft portion other than the hard portion will wear away. As shown in FIG. 10B, the portion between the hard portions 31 results in a concave streak portion 32, in which lubrication oil is stored.

When the concave streak portion 32 is produced in this manner, lubrication oil will be stored within the concave streak portion 32 when the engine is stopped. Therefore, as in the above described first embodiment, lubrication oil can be supplied to the portion abutted by the main shaft portion 2 nearly at the same time as start of the engine, and wear resistance and anti-seizure property are enhanced.

Figure 11A:
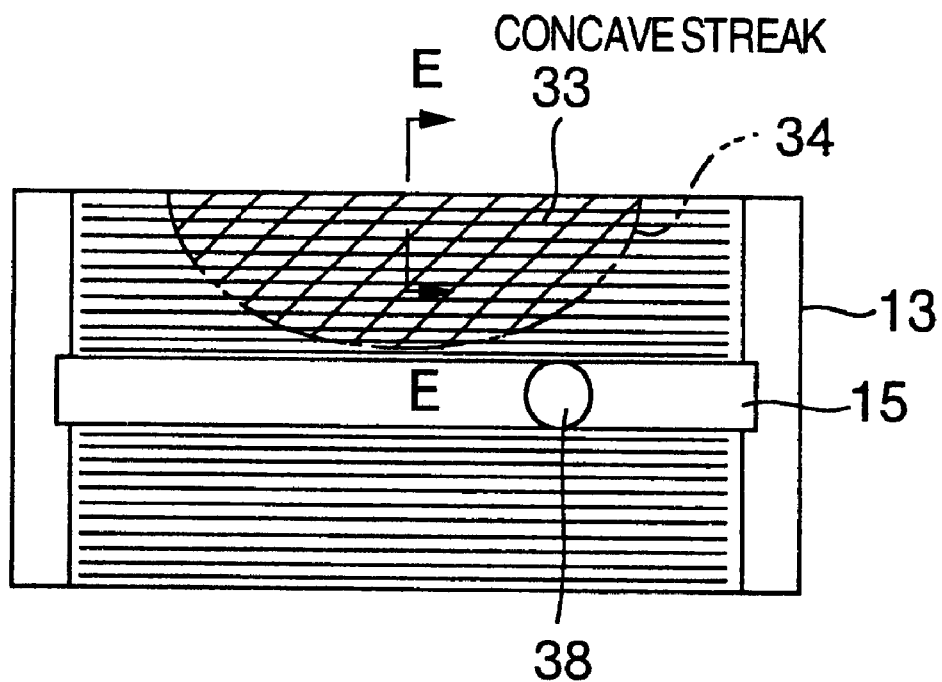
FIG. 11A is a view similar to FIG. 1 showing a sixth embodiment of the present invention.
Figure 11B:
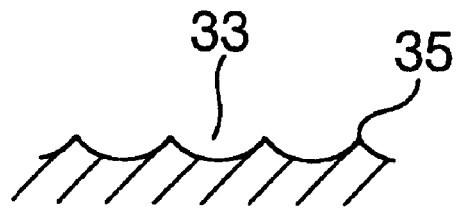
FIG. 11B is an enlarged sectional view substantially taken along a line E—E of FIG. 11A.

FIGS. 11A and 11B show a sixth embodiment of the present invention. On the bearing surface of the upper half bearing 13 or the upper and lower half bearings 13 and 14, concave streaks 33 extending in the circumferential direction as shown in FIG. 11B are formed by boring. Then, the area including the portion abutted by the main shaft portion 2 among the bearing surface is formed as a hard portion 34 by emitting a laser beam. Moreover, the hard portion 34 is shown by oblique lines in FIG. 11A.

In the upper half bearing 13 of this embodiment, lubrication oil can be supplied to the portion which is abutted by the main shaft portion 2 nearly at the same time as start of the engine, as in the above described embodiment, because the lubrication oil can be stored in the recess 33 when the engine is stopped.

Incidentally, the convex streak portion 35 between the concave streaks 33 wears easily. For this reason, it is considered that the height of the convex streak portion 35 becomes low due to long use and therefore lubrication oil cannot be stored in the concave streak 33 reduced in depth. However, in this embodiment, since the area including the portion abutted by the main shaft portion 2 is formed as a hard portion 34, the convex streak portion 35 in the hard portion 34 is difficult to wear even if the convex streak portion 35 in a portion other than the hard portion 34 is reduced in height, so that lubrication oil can be sufficiently stored in the concave streak 33 in the hard portion 34. Thus, lubrication oil can be supplied to the portion abutted by the main shaft portion 2 at the time of starting the engine, over a long time. Moreover, this embodiment possibly can prevent reduction of the conformability and embeddability of the upper half bearing 13 since the whole bearing surface of the upper half bearing 13 is not hardened.

Figure 12:
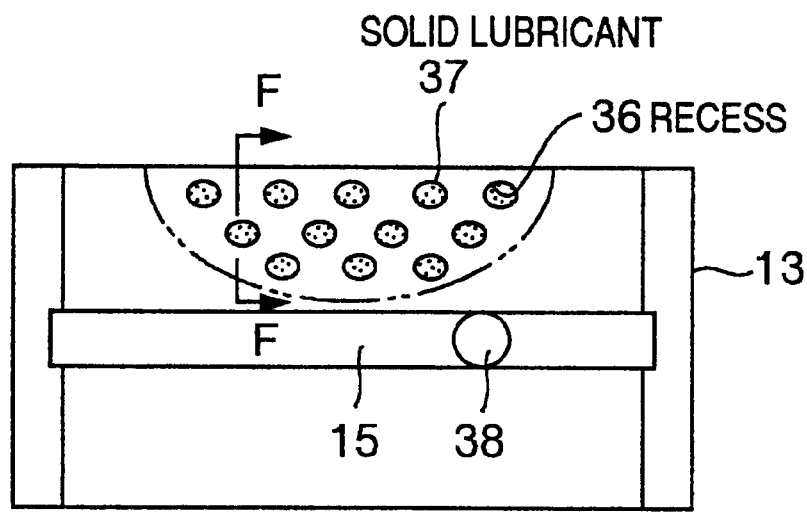
FIG. 12A is a view similar to FIG. 1 showing a seventh embodiment of the present invention.
FIG. 12B is a sectional view substantially taken along a line F—F of FIG. 12A.
Figure 12:
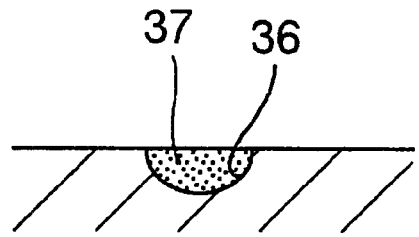

FIG. 12 shows a seventh embodiment of the present invention. Between the axial center and front end of the upper half bearing 13, the area including the portion abutted by the main shaft portion 2 has a plurality of circular small recesses 36. Each recess 36 is filled with a solid lubricant 37 such as molybdenum disulfide, graphite or the like.

In the seventh embodiment, when the engine is started, the solid lubricant 37 within the recess 36 is supplied to the space between the upper half bearing 13 and the main shaft portion 2, and therefore wear resistance and anti-seizure property are enhanced.

Moreover, an oil hole 38 of the upper half bearing 13 is shown as a circular one in the third embodiment of FIG. 3 through the seventh embodiment of FIG. 12.

What is claimed is:

1. A main bearing for an engine, said bearing supporting a crankshaft of the engine on which a radial load always operates in a single direction from tension of a belt transmitting rotation from said crankshaft, said main bearing comprising a first half bearing and a second half bearing, wherein said belt applies a radial load to said crankshaft to bias said crankshaft toward said first half bearing when said crankshaft is not rotating, said load applied by said belt being in a direction opposite to a force applied to said crankshaft from combustion pressure of the engine when said crankshaft is rotating, said first half bearing having an oil pocket provided in the surface of said plain bearing to provide means for storing lubricant therein when said crankshaft is not rotating, and wherein said second half bearing has no oil pocket in a zone thereof against which said crankshaft is forced when said crankshaft is rotating.

2. The main bearing according to claim 1 wherein said oil pocket comprises an oil groove extending along the length of said first half bearing in its circumferential direction.

3. The main bearing according to claim 2 wherein said oil pocket further comprises a branch groove formed so as to branch off from said oil groove.

4. The main bearing of claim 2 wherein said oil groove extends the entire circumferential length of said first half bearing.

5. A main bearing mounted within an engine, the main bearing supporting an engine crankshaft on which a radial load always operates in a single direction from tension of a belt transmitting rotation from said crankshaft, said main bearing comprising a first half bearing and a second half bearing, wherein said belt applies a radial load to said crankshaft to bias said crankshaft toward said first half bearing when said crankshaft is not rotating, said load applied by said belt being in a direction opposite to a force applied to said crankshaft from combustion pressure when said crankshaft is rotating, said first half bearing having an oil pocket provided in the surface of said plain bearing for storing lubricant therein when said crankshaft is not rotating.

6. The main bearing according to claim 5, wherein said oil pocket comprises an oil groove extending along the length of said first half bearing in its circumferential direction.

7. The main bearing according to claim 6 wherein said oil pocket further comprises a branch groove formed so as to branch off from said oil groove.

8. The main bearing of claim 6 wherein said oil groove extends the entire circumferential length of said first half bearing.

* * * * *